US011254243B2

(12) United States Patent
Nock et al.

(10) Patent No.: US 11,254,243 B2
(45) Date of Patent: Feb. 22, 2022

(54) SEAT-BACK ADJUSTMENT SYSTEM

(71) Applicant: LEAR CORPORATION, Southfield, MI (US)

(72) Inventors: Eckhard Nock, Wolnzach (DE); Johannes Barzen, Pfaffenhofen (DE); Srinivasa Reddy Chintakula, Oberding (DE)

(73) Assignee: Lear Corporation, Southfield, MI (US)

( * ) Notice: Subject to any disclaimer, the term of this patent is extended or adjusted under 35 U.S.C. 154(b) by 7 days.

(21) Appl. No.: 16/690,973

(22) Filed: Nov. 21, 2019

(65) Prior Publication Data
US 2020/0164776 A1 May 28, 2020

(30) Foreign Application Priority Data

Nov. 22, 2018 (DE) .......................... 102018220029.7

(51) Int. Cl.
*B60N 2/22* (2006.01)
*B60N 2/42* (2006.01)
*B60N 2/427* (2006.01)
*B60N 2/23* (2006.01)

(52) U.S. Cl.
CPC ............. *B60N 2/2227* (2013.01); *B60N 2/23* (2013.01); *B60N 2/42709* (2013.01)

(58) Field of Classification Search
CPC .... B60N 2/2227; B60N 2/23; B60N 2/42709; B60N 2/2245; B60N 2/366; B60N 2/2213; B60N 2/2231; B60N 2/224; B60N 2/231; B60N 2/233; B60N 2/235; B60N 2/2352; B60N 2/2356; B60N 2/42727

USPC ....................................... 297/216.13, 378.13
See application file for complete search history.

(56) References Cited

U.S. PATENT DOCUMENTS

| 4,988,134 | A | 1/1991 | Vidwans et al. |
| 6,352,285 | B1 * | 3/2002 | Schulte ................. B60N 2/809 |
| | | | 280/756 |
| 7,077,471 | B2 | 7/2006 | Schumann et al. |
| 7,607,729 | B1 | 10/2009 | Udriste |

(Continued)

FOREIGN PATENT DOCUMENTS

| CN | 1498567 A | 5/2004 |
| CN | 202716756 U | 2/2013 |

(Continued)

OTHER PUBLICATIONS

Search Report re German Patent Application No. 102018220029.7 dated Dec. 6, 2019.
Office Action re CN App. No. 201911140704.8 dated Oct. 26, 2021.

*Primary Examiner* — Kyle J. Walraed-Sullivan
(74) *Attorney, Agent, or Firm* — Brooks Kushman P.C.

(57) ABSTRACT

A seat-back adjustment system for a seat for a vehicle may include a frame member configured for attachment to a support structure of the vehicle, and a rack arrangement movably attached to the frame member. The rack arrangement may include an adjustment rack and a locking rack. A driving arrangement may include at least one gear intermeshing with the adjustment rack and operable to move the rack arrangement relative to the frame member, and a locking arrangement may include at least one locking element operable to engage the locking rack when the vehicle experiences at least a predetermined negative acceleration.

16 Claims, 4 Drawing Sheets

(56) References Cited

U.S. PATENT DOCUMENTS

| | | | |
|---|---|---|---|
| 2002/0011746 A1* | 1/2002 | Muhlberger | B60N 2/4221 297/344.12 |
| 2002/0057008 A1* | 5/2002 | Shephard | B60N 2/2352 297/366 |
| 2005/0062327 A1 | 3/2005 | Griswold et al. | |
| 2007/0126277 A1* | 6/2007 | Musale | B60R 22/26 297/464 |
| 2008/0093899 A1* | 4/2008 | Stueckle | B60N 2/42781 297/216.1 |
| 2009/0146486 A1* | 6/2009 | Beneker | B60N 2/43 297/463.1 |

FOREIGN PATENT DOCUMENTS

| | | |
|---|---|---|
| DE | 3612474 A1 | 1/1988 |
| DE | 69700026 T2 | 4/1999 |
| DE | 102007014371 A1 | 10/2008 |
| JP | 2007176404 A | 7/2007 |

\* cited by examiner

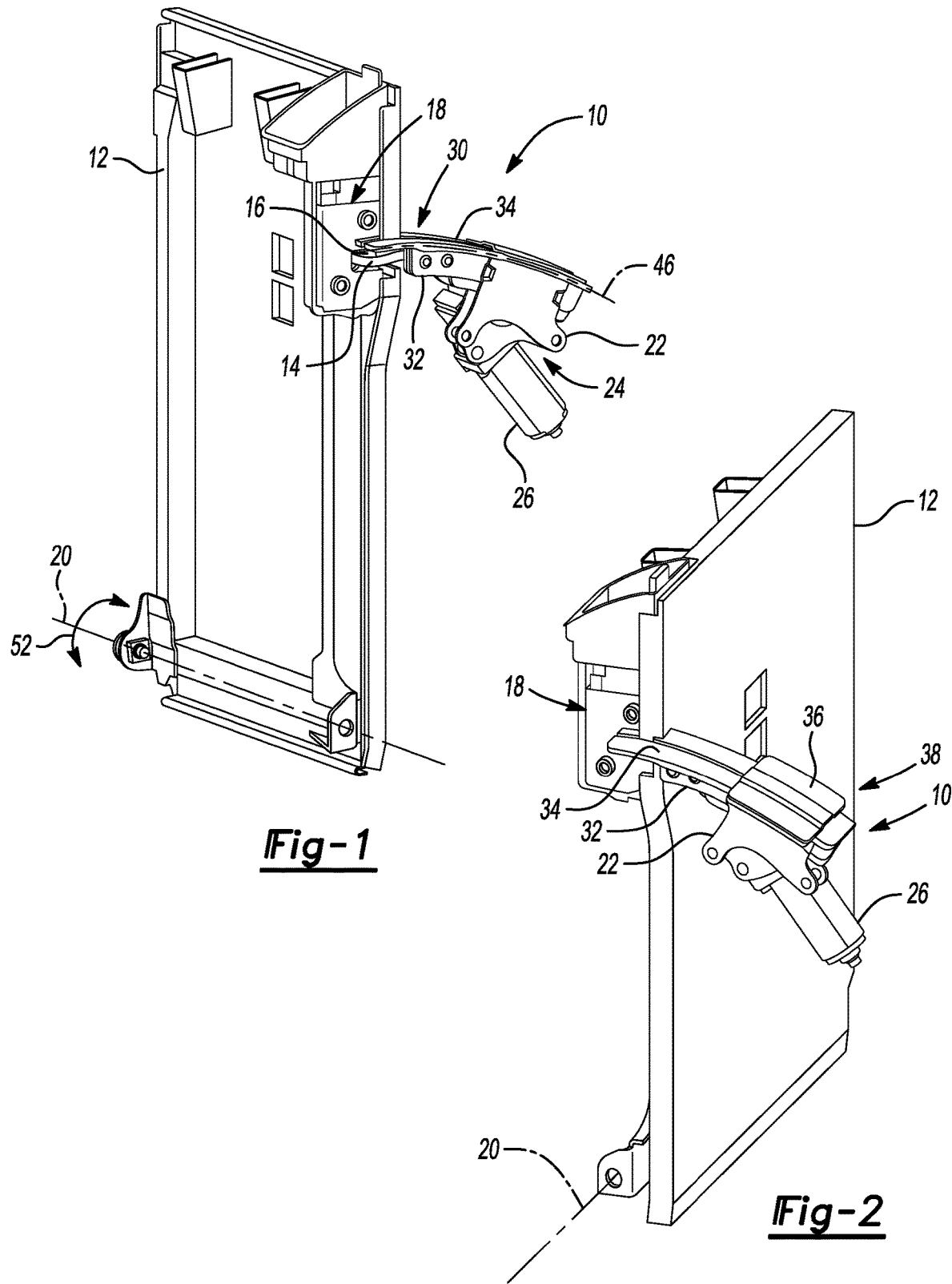

# SEAT-BACK ADJUSTMENT SYSTEM

CROSS-REFERENCE TO RELATED APPLICATIONS

This application claims foreign priority benefits under 35 U.S.C. § 119(a)-(d) to DE 10 2018 220 029.7, filed Nov. 22, 2018, the disclosure of which is hereby incorporated by reference in its entirety.

TECHNICAL FIELD

The present disclosure relates to a seat-back adjustment system for a seat for a vehicle.

BACKGROUND

Vehicle seats are often equipped with an adjustment system for adjusting the angle of the seat back to accommodate a position desired by the occupant. Some of these seat-back adjustment systems are motorized, while others are manual. Some seat-back adjustment systems provide only a few discrete positions for the seat back throughout a particular range of adjustment. In contrast, other adjustment systems—especially motorized adjustment systems—may provide continuous adjustment throughout the entire range of adjustment. In such a case, one or more gears may interact with the motor to move the seat back to the desired position, and upon reaching the desired position, the interaction of the gears with the motor turned off, maintains the seat back in its position.

The strength of the interacting gear teeth may be adequate to maintain the seat back in the desired position whenever it is subject to standard forces exerted by a vehicle occupant or resulting from standard vehicle movement; however, in the event of an extremely high acceleration or deceleration—which may occur in the event of a head-on or rear-end collision—this may not be the case. The resultant forces on the seat back caused by vehicle impact may cause mechanical failure—shear, tension, etc.—of the gear teeth, causing the seat back to move from the desired position. Merely increasing the strength of the material of the gear teeth is not a good solution. Extremely strong materials are difficult—e.g., expensive—to manufacture with the precision necessary for gear teeth in a seat-back adjustment system. Merely increasing the size of the teeth is also not a good solution because it does not provide the fine positioning desired from a seat-back adjustment system. Therefore, a need exists for a cost-effective seat-back adjustment system that facilitates fine positioning of the seat back and has the strength required to maintain the seat back in its position when it is subject to high forces.

SUMMARY

Embodiments disclosed herein may include a seat-back adjustment system for a seat for a vehicle that includes a frame member configured for attachment to a support structure of the vehicle. A rack arrangement may be movably attached to the frame member and include an adjustment rack having a plurality of adjustment teeth. The rack arrangement may also include a locking rack immovable relative to the adjustment rack and having a plurality of locking teeth. A driving arrangement may include at least one gear having gear teeth intermeshing with the adjustment teeth and operable to move the rack arrangement relative to the frame member. A locking arrangement may include at least one locking element operable to engage the locking teeth and inhibit movement of the rack arrangement relative to the frame member when the vehicle experiences at least a predetermined negative acceleration.

Embodiments disclosed herein may include a seat-back adjustment system for a seat for a vehicle that includes a frame member configured for attachment to a support structure of the vehicle. A rack arrangement may be movably attached to the frame member and include an adjustment rack having a first mechanical strength and a locking rack having a second mechanical strength greater than the first mechanical strength. A driving arrangement may include at least one gear intermeshing with the adjustment rack and operable to move the rack arrangement relative to the frame member. A locking arrangement may include at least one locking element positioned apart from the locking rack prior to the vehicle experiencing a predetermined negative acceleration and operable to engage the locking rack when the vehicle experiences at least the predetermined negative acceleration such that movement of the rack arrangement relative to the frame member is inhibited.

Embodiments disclosed herein may include a seat-back adjustment system for a seat for a vehicle that includes a frame member configured for attachment to a support structure of the vehicle. A rack arrangement may be movably attached to the frame member and include an adjustment rack having a plurality of adjustment teeth having a first shear strength and a locking rack having a plurality of locking teeth having a second shear strength greater than the first shear strength. The adjustment rack may be attached to the locking rack such that the adjustment rack and locking rack are movable together relative to the frame member and immovable relative to each other. A driving arrangement may include at least one gear having gear teeth intermeshing with the adjustment teeth and operable to move the rack arrangement relative to the frame member. A locking arrangement may include at least one locking element operable to engage the locking teeth and inhibit movement of the rack arrangement relative to the frame member when the seat is subject to at least a predetermined force.

BRIEF DESCRIPTION OF THE DRAWINGS

FIG. 1 shows a seat-back adjustment system for a vehicle attached to a seat-back frame in accordance with embodiments described herein;

FIG. 2 shows a different aspect of the seat-back adjustment system and the seat-back frame shown in FIG. 1;

DETAILED DESCRIPTION

Figure 3:
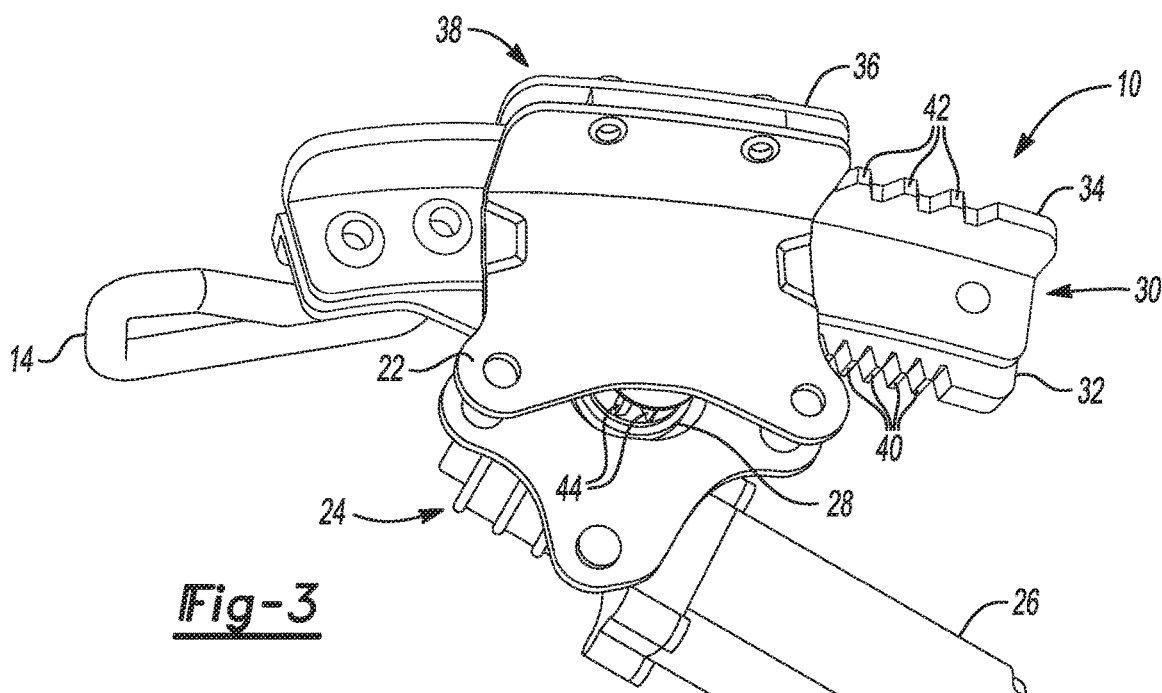
FIG. 3 shows the seat-back adjustment system removed from the seat-back frame.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a seat-back adjustment system 10 for a seat for a vehicle in accordance with embodiments described herein. The seat-back adjustment system 10 is connected to the frame of a seat back 12. More particularly, a striker rod 14 of the seat-back adjustment system 10 is engaged by a latch hook 16, which forms a part of a seat latch 18. The seat back 12 is pivotable about an axis 20 relative to a seat bottom when installed in a vehicle. The seat-back adjustment system 10 includes a frame member 22, which is configured for attachment to a support structure of the vehicle, such as a seat frame or vehicle body, for example. The seat-back adjustment system 10 also includes a driving arrangement 24, which includes a motor 26 and a gear 28—see FIG. 3.

The seat-back adjustment system 10 further includes a rack arrangement 30, which includes an adjustment rack 32 and a locking rack 34, and which is illustrated partially schematically in FIG. 1—i.e., the teeth on the racks 32, 34 are not shown in detail. In addition to the elements described above, FIG. 2 also shows a cap 36, which, as described in more detail below, is part of a locking arrangement 38. FIG. 3 shows the seat-back adjustment system 10 removed from the seat back 12. As shown in FIG. 3, the adjustment rack 32 includes a plurality of adjustment teeth 40, and the locking rack 34 includes a plurality of locking teeth 42. In the embodiment shown in FIG. 3, the adjustment teeth 40 are oriented in a first direction—generally downward as shown in the drawing figure—while the locking teeth 42 are oriented in a second direction that is generally perpendicular to the first direction. Other orientations of the adjustment teeth 40 and locking teeth 42 are contemplated, but the arrangement shown in FIG. 3 facilitates the separation of the two functions of the teeth 40, 42 and their respective racks 32, 34.

The rack arrangement 30 is movably attached to the frame member 22; more specifically, the adjustment rack 32 is attached to the locking rack 34 so they are movable together relative to the frame member 22, but are immovable relative to each other. The gear 28 includes a plurality of gear teeth 44, which intermesh with the adjustment teeth 40 so that the driving arrangement 24 is operable to move the rack arrangement 30 relative to the frame member 22. The adjustment rack 32 is arcuate over at least a portion of its length as illustrated by the curved axis 46 shown in FIG. 1. This facilitates arcuate movement of the seat back 12 when the seat back 12 is adjusted by the adjustment rack 32. The arcuate movement parallels the movement of a seat back that is pivotably attached to a seat bottom, such as commonly found in vehicle seats. The arcuate shape of the adjustment rack 34 provides advantages over linear racks by allowing a greater angular travel for the seat back 12.

In the embodiment illustrated in FIG. 3, the adjustment rack 32 is made from a polymeric material, which allows the adjustment teeth 40 to be molded with the precision geometry desired for fine adjustment of the seat back 12. In other embodiments, adjustment racks may be made from other materials, such as a metallic material with a polymeric over-mold, or any other materials effective to provide the desired functionality. Creation of the precision adjustment teeth 40 is facilitated by having an adjustment rack, such as the adjustment rack 32 molded from a polymeric material. This also facilitates manufacturing the adjustment rack 32 with the arcuate configuration described above.

The adjustment rack 32 has a first mechanical strength and the locking rack 34 has a second mechanical strength greater than the first mechanical strength. In the embodiment shown in FIG. 3, the locking rack 34 is made from a metallic material, but in other embodiments may be made from different materials that provide the desired functionality. More specifically, the adjustment teeth 40 on the adjustment rack 32 have a first shear strength, and the locking teeth 42 on the locking rack 34 have a second shear strength greater than the first shear strength. As described in more detail below, this allows the two racks 32, 34 to each be configured to effectively perform its desired function—adjustment and locking, respectively.

Figures 4, 5:
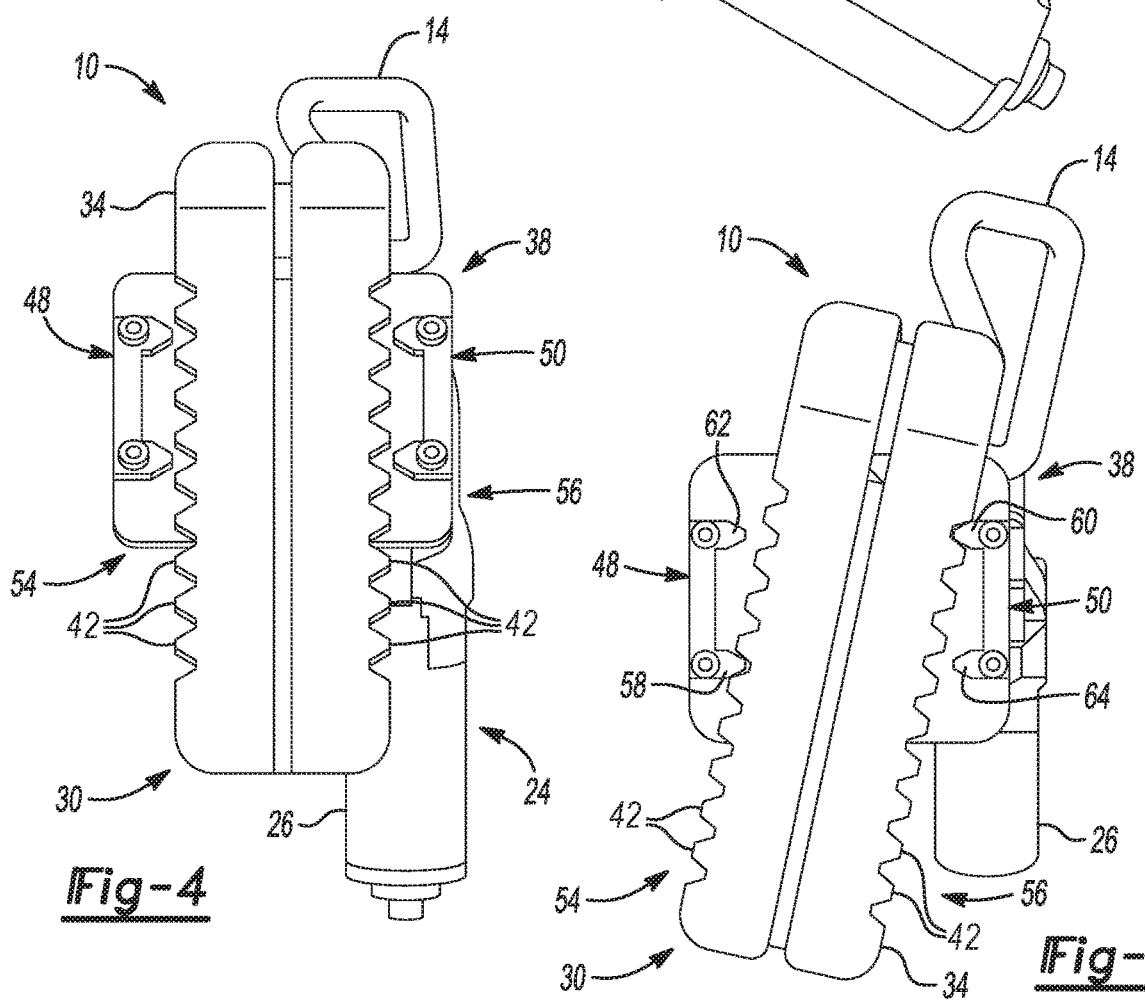
FIG. 4 shows a portion of the seat-back adjustment system shown in FIG. 3 prior to a vehicle impact.
FIG. 5 shows the seat-back adjustment system shown in FIG. 4 after a vehicle impact.

FIG. 4 shows a top view of the seat-back adjustment system 10 with the cap 36 of the locking arrangement 38 removed. In this view, locking elements 48, 50 are visible. The locking elements 48, 50 are part of the locking arrangement 38 and are operable to engage the locking teeth 42 and inhibit movement of the rack arrangement 30 relative to the frame member 22 when the vehicle experiences at least a predetermined negative acceleration. As shown in FIG. 4, the seat-back adjustment system 10 is not subject to high forces, and in fact, is in a position where the driving arrangement 24 may be employed to adjust the seat back 12 to a desired position. Movement of the seat back 12 during adjustment is indicated by the direction arrow 52 shown in FIG. 1. As also shown in FIG. 1, the seat back 12 is attached to the vehicle body or other support structure through the frame member 22 on one side of the seat back 12 only. Therefore, in the event of a large negative acceleration—such as might be experienced during a head-on collision—the seat back 12 will be subject to a large force and because it is anchored on one side only, it will have a tendency to twist. This is illustrated in FIG. 5.

In FIG. 5, the seat-back adjustment system 10 is shown after the vehicle has undergone a large negative acceleration, which in turn, subjects the seat back 12 to a large force in a forward direction. In the embodiment shown in FIG. 5, the locking rack 34 includes a first set 54 of the locking teeth 42 and a second set 56 of the locking teeth 42 positioned opposite the first set 54. The locking element 48 includes a first tooth 58 positioned to engage at least one of the locking teeth 42 of the first set 54 when the vehicle experiences at least a predetermined negative acceleration. Similarly, the locking element 50 includes a second tooth 60 positioned to engage at least one of the locking teeth 42 of the second set 56 when the vehicle experiences at least a predetermined negative acceleration.

In other words, the teeth 58, 60 of the respective locking elements 48, 50 can be positioned so that they only engage the locking teeth 42 when there is at least a minimum displacement of the locking rack 34. The minimum displacement can be defined to coincide with a predetermined negative acceleration of the vehicle. As shown in FIG. 5, the locking element 48 includes another tooth 62 and the locking element 50 includes another tooth 64, which are positioned to engage the locking teeth 42 in the event that the seat back 12 twists in the opposite direction. Each of the teeth 58, 60, 62, 64 are locking—element teeth that are configured to engage the locking teeth 42 of the locking rack 34 in the event of the vehicle experiencing at least the predetermined negative acceleration.

With the teeth 58, 60 engaged with the locking teeth 42 of the locking rack 34, movement of the rack arrangement 30 relative to the frame member 22—and therefore relative to the support structure to which it is attached-is inhibited. In the embodiment shown in FIGS. 4 and 5, the locking elements 48, 50 are positioned apart from the locking rack 34 prior to the vehicle experiencing the predetermined negative acceleration—see FIG. 4—but then are engaged with the locking rack 34 after the vehicle experiences at least the predetermined negative acceleration—see FIG. 5. As described above, the predetermined negative acceleration can be correlated with a predetermined force on the seat back 12, which then may be used in various calculations to appropriately configure the size and positions of the various elements of the seat-back adjustment system 10.

Figure 6:
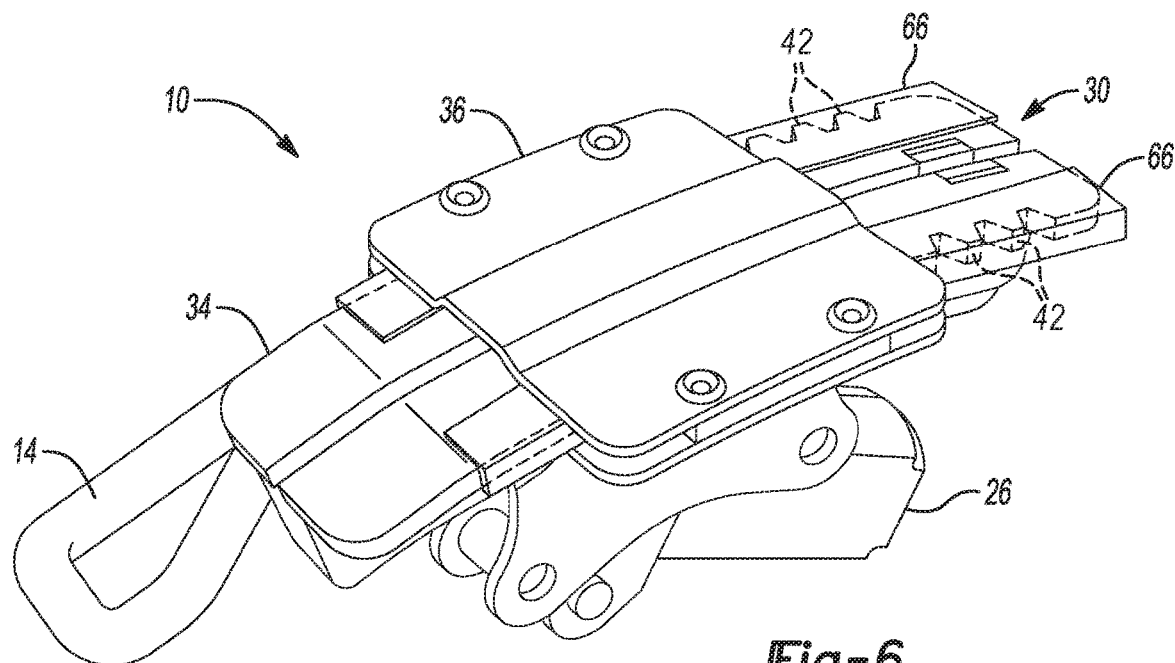
FIG. 6 shows additional features of the seat-back adjustment system shown in FIG. 3.

FIG. 6 shows the seat-back adjustment system 10 with an additional feature associated with the rack arrangement 30. In particular, a two—piece plastic cover 66 is positioned over the locking teeth 42 of the locking rack 34. The plastic cover 66 is frangible—i.e., easily broken—so that when the vehicle experiences at least the predetermined negative acceleration, thereby subjecting the seat back 12 to at least the predetermined force, the frangible cover portion 66 breaks to facilitate engagement between the locking—teeth 42 and the locking element teeth 58, 60 as shown in FIG. 5. Prior to the vehicle experiencing the large negative acceleration, the cover 66 is positioned to maintain separation between the locking teeth 42 and the locking element teeth 58, 60, 62, 64. The cover 60 may also facilitate quiet movement of the rack arrangement 30 when the seat back 12 is adjusted.

Figure 7:
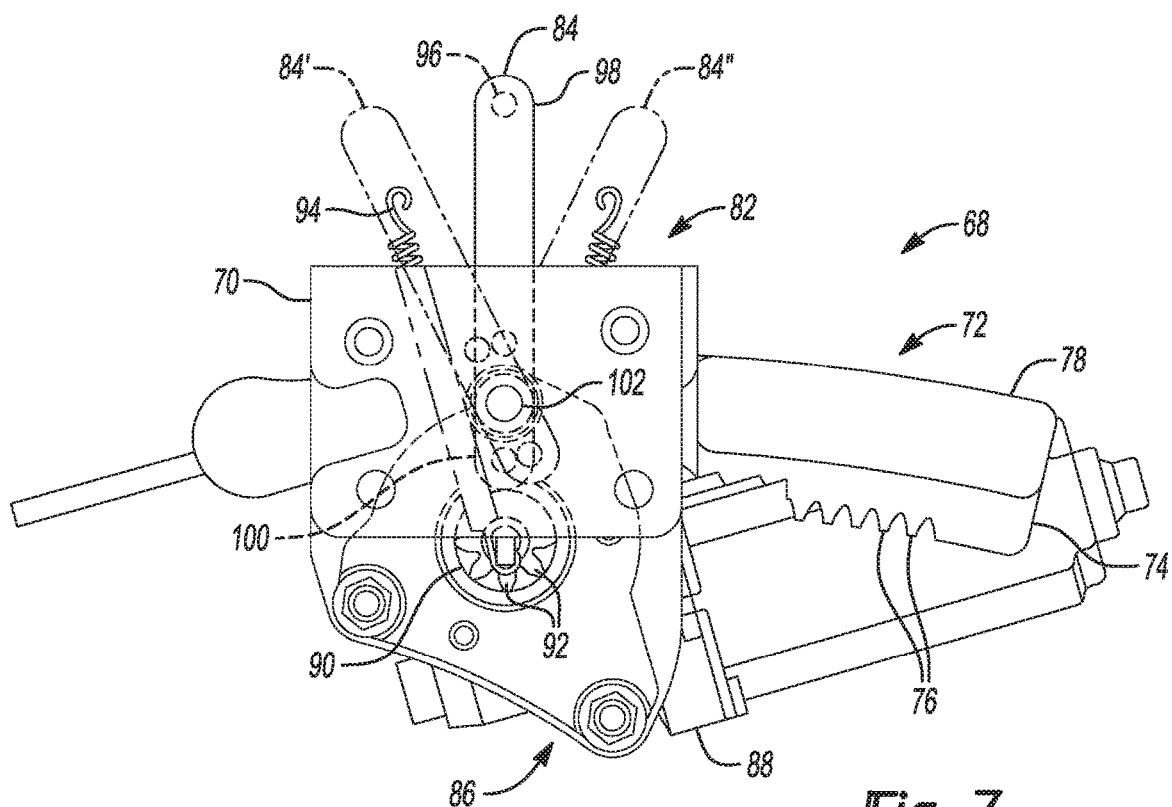
FIG. 7 shows a seat-back adjustment system for a vehicle in accordance with embodiments described herein.

FIG. 7 shows a seat-back adjustment system 68 in accordance with embodiments described herein. The seat-back adjustment system 68 includes a frame member 70 configured for attachment to a support structure of the vehicle, such as a seat frame or a portion of the vehicle body. The seat-back adjustment system 68 also includes a rack arrangement 72, which includes an adjustment rack 74 having adjustment teeth 76 and a locking rack 78 having locking teeth 80 positioned along the top and bottom of the locking rack 78—see FIG. 8. Similar to the adjustment rack 32, the adjustment rack 74 is arcuate over at least a portion of its length, which facilitates a greater range of motion for a pivoting seat back.

The seat-back adjustment system 68 further includes a locking arrangement 82, which includes a striker bar 84. In FIG. 7, the striker bar 84 is shown in three different positions: a neutral, center position, and forward and rearward positions in which it is labeled with the prime (') and double prime (") symbols, respectively. The seat-back adjustment system 68 includes a driving arrangement 86, which includes a motor 88 and a gear 90. The gear 90 has gear teeth 92, which are configured to intermesh with the adjustment teeth 76 to move the rack arrangement 72 relative to the frame member 70 this is shown in more detail in FIG. 8.

The striker bar 84 is disposed toward the neutral position by a biasing element 94, which in this embodiment is a tension spring. The striker bar 84 is pivotably attached to the frame member 70 and has a high center of gravity, indicated symbolically at 96. Because of this configuration, it will move to the forward position 84' when the vehicle experiences at least the predetermined negative acceleration. In addition, the striker bar 84 will move to the rearward position 84" when the vehicle experiences at least a predetermined positive acceleration. In either case, a locking element on the striker bar 84 will engage with the locking teeth 80 to inhibit movement of the rack arrangement 72 relative to the frame member 70. This is explained and shown in more detail in conjunction with FIGS. 8 and 9.

Figure 8:
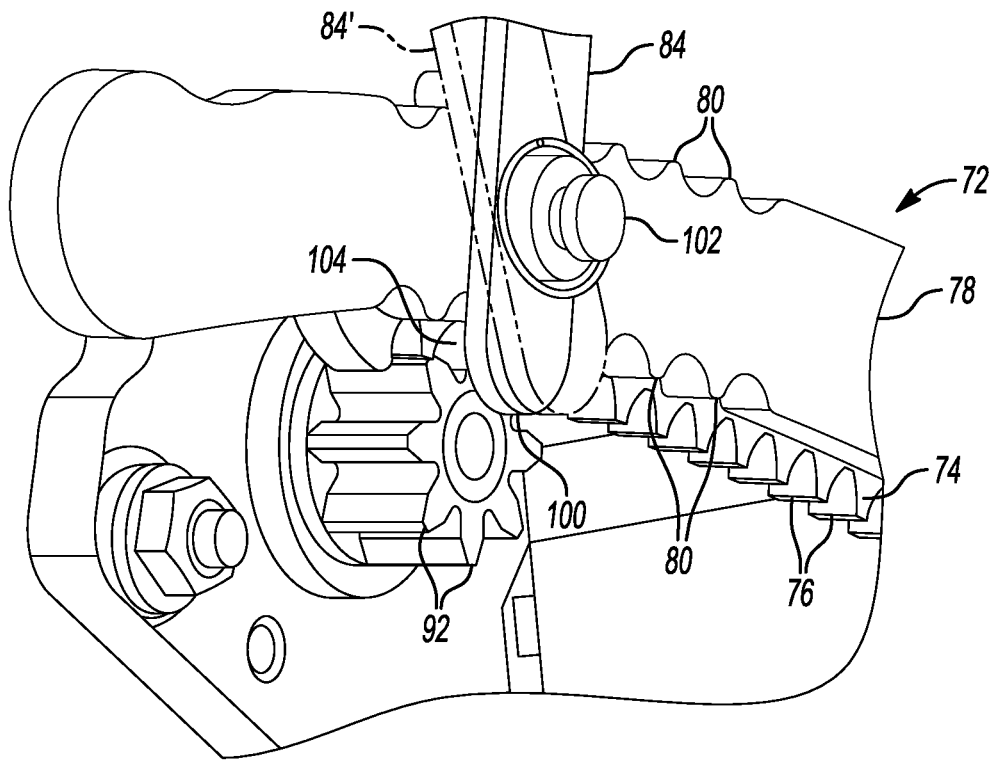
FIG. 8 shows a detail view of a portion of the seat-back adjustment system shown in FIG. 7.

The high center of gravity for the striker bar 84 may be implemented in any of a number of ways, including adding material to the upper portion of the striker bar 84, manufacturing it so that it is thicker at the upper portion, making the striker bar from different materials, the more dense of which is located near the top, or any other way effective to position the center of gravity and its desired location. As shown in FIG. 7, the striker bar 84 includes two ends 98, 100 and a pivoting connection 102 connected to the frame member 70 and positioned between the two ends 98, 100. As shown in FIG. 8, the striker bar 84 includes a locking element 104 positioned proximate to the lower end 100 of the striker bar 84. In the embodiment shown in FIG. 8, the locking element 104 is a pin that is configured to engage at least one of the locking teeth 80. This is shown in more detail in FIG. 9.

Figure 9:
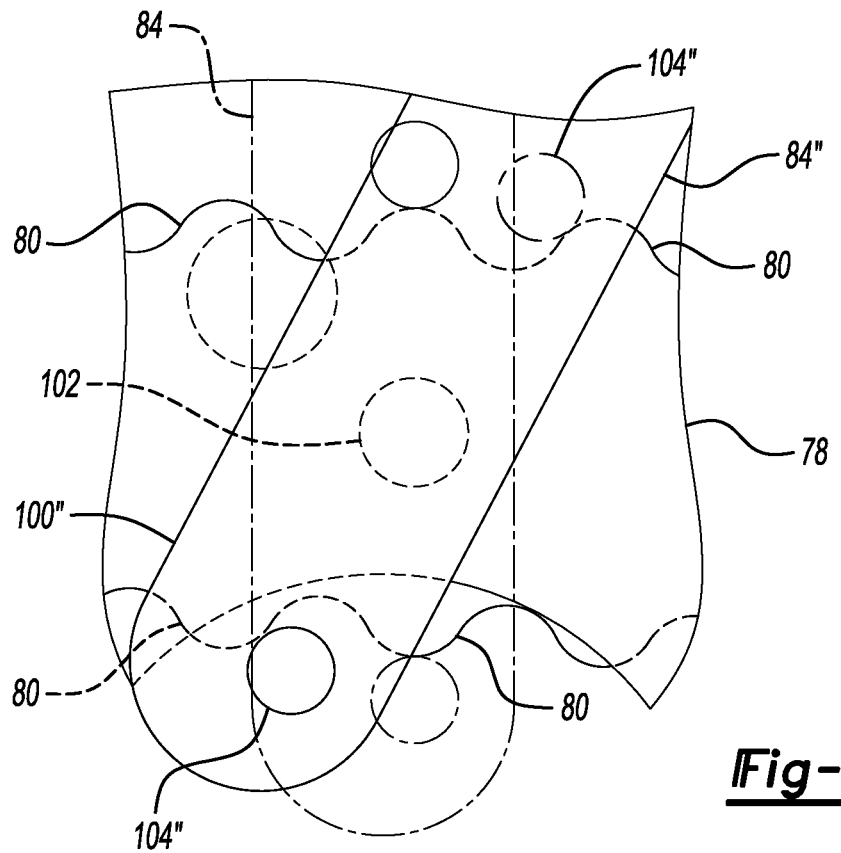
FIG. 9 shows additional detail of the seat-back adjustment system shown in FIG. 7.

When the vehicle experiences at least the predetermined positive acceleration, the tendency of the spring 94 to hold the striker bar 84 in its neutral position is overcome and the striker bar moves to its rearward position indicated by 84". This is shown in FIG. 9, where it is also shown that the striker bar 84" has two of the locking elements, or pins 104", each of which engages with the locking teeth 80 on the locking rack 78. In this position, the rack arrangement 72 is inhibited from moving relative to the frame member 70. Similar to the seat-back adjustment system 10, the locking rack 78 of the seat-back adjustment system 68 may be manufactured from a metallic material, such as steel, for example, while the adjustment rack 74 may be manufactured from a polymeric material. This allows the adjustment teeth 76 to be manufactured inexpensively, but still made to the fine precision necessary for comfortable adjustment. Similarly, making the locking rack 78 from steel provides the strength necessary to inhibit movement of the seat back in the event of an impact. By separating the functions of adjustment and locking, and configuring the respective powertrain elements—their size, shape, material properties, etc.—allows both functions to be performed as needed without sacrificing performance of either.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat-back adjustment system for a seat for a vehicle, comprising:
   a frame member configured for attachment to a support structure of the vehicle;
   a rack arrangement movably attached to the frame member and including an adjustment rack having a plurality of adjustment teeth and a locking rack immovable relative to the adjustment rack and having a plurality of locking teeth;
   a driving arrangement including at least one gear having gear teeth intermeshing with the adjustment teeth and operable to move the rack arrangement relative to the frame member; and
   a locking arrangement including at least one locking element operable to engage the locking teeth and inhibit movement of the rack arrangement relative to the frame member when the vehicle experiences at least a predetermined negative acceleration, and wherein the locking rack includes a first set of the locking teeth and a second set of the locking teeth positioned opposite the first set of the locking teeth, and the at least one locking element includes a first tooth positioned to engage at least one of the locking teeth of the first set of the locking teeth when the vehicle experiences at least the predetermined negative acceleration, and the at least one locking element further includes a second tooth engage at least one of the locking teeth of the second set of the locking teeth when the vehicle experiences at least the predetermined negative acceleration.

2. The seat-back adjustment system of claim 1, wherein the adjustment teeth have a first shear strength and the locking teeth have a second shear strength greater than the first shear strength.

3. The seat-back adjustment system of claim 1, wherein the at least one locking element includes a tooth configured to engage at least one of the locking teeth when the vehicle experiences at least the predetermined negative acceleration.

4. The seat-back adjustment system of claim 1, wherein the adjustment rack comprises a polymeric material, and the locking rack comprises a metallic material.

5. The seat-back adjustment system of claim 1, wherein the at least one locking element is further operable to engage the locking teeth and inhibit movement of the rack arrangement relative to the frame member when the vehicle experiences at least a predetermined positive acceleration.

6. The seat-back adjustment system of claim 1, wherein the adjustment rack has a first mechanical strength and the locking rack has a second mechanical strength greater than the first mechanical strength.

7. A seat-back adjustment system for a seat for a vehicle, comprising:
a frame member configured for attachment to a support structure of the vehicle;
a rack arrangement movably attached to the frame member and including an adjustment rack having a first mechanical strength and a locking rack having a second mechanical strength greater than the first mechanical strength;
a driving arrangement including at least one gear intermeshing with the adjustment rack and operable to move the rack arrangement relative to the frame member; and
a locking arrangement including at least one locking element positioned apart from the locking rack prior to the vehicle experiencing a predetermined negative acceleration and operable to engage the locking rack when the vehicle experiences at least the predetermined negative acceleration such that movement of the rack arrangement relative to the frame member is inhibited, and
wherein the rack arrangement further incudes a frangible cover portion positioned to maintain separation between the locking teeth and the at least one locking element prior to the vehicle experiencing the predetermined negative acceleration, the frangible cover portion being configured to break when the vehicle experiences at least the predetermined negative acceleration to facilitate engagement between the locking teeth and the at least one locking element.

8. The seat-back adjustment system of claim 7, wherein the adjustment rack includes a plurality of adjustment teeth, at least some of the adjustment teeth being oriented in a first direction, and wherein the locking rack includes a plurality of locking teeth, at least some of the locking teeth being oriented in a second direction perpendicular to the first direction.

9. The seat-back adjustment system of claim 7, wherein the adjustment rack includes a plurality of adjustment teeth and the locking rack includes a plurality of locking teeth, and wherein the at least one locking element includes a tooth configured to engage the locking teeth when the vehicle experiences at least the predetermined negative acceleration.

10. The seat-back adjustment system of claim 9, wherein the locking rack includes a first set of the locking teeth and a second set of the locking teeth positioned opposite the first set of the locking teeth, and wherein the at least one locking element includes a plurality of locking element teeth, at least one of the locking element teeth being configured to engage the first set of the locking teeth, and at least one other of the locking element teeth being configured to engage the second set of the locking teeth, when the vehicle experiences at least the predetermined negative acceleration.

11. The seat-back adjustment system of claim 7, wherein the adjustment rack is configured for attachment to a pivotable seat back of the seat, and wherein at least a portion of a length of the adjustment rack is arcuate to facilitate arcuate movement of the seat back when the seat back is adjusted by movement of the adjustment rack.

12. The seat-back adjustment system of claim 7, wherein the at least one locking element is further operable to engage the locking rack and inhibit movement of the rack arrangement relative to the frame member when the vehicle experiences at least a predetermined positive acceleration.

13. The seat-back adjustment system of claim 12, wherein the locking arrangement includes a striker bar disposed toward a neutral position by a biasing element and configured to move out of the neutral position to engage the locking rack when the vehicle experiences at least the predetermined positive acceleration or at least the predetermined negative acceleration.

14. A seat-back adjustment system for a seat for a vehicle, comprising:
a frame member configured for attachment to a support structure of the vehicle;
a rack arrangement movably attached to the frame member and including an adjustment rack having a plurality of adjustment teeth having a first shear strength and a locking rack having a plurality of locking teeth having a second shear strength greater than the first shear strength, the adjustment rack being attached to the locking rack such that the adjustment rack and locking rack are movable together relative to the frame member and immovable relative to each other;
a driving arrangement including at least one gear having gear teeth intermeshing with the adjustment teeth and operable to move the rack arrangement relative to the frame member; and
a locking arrangement including at least one locking element operable to engage the locking teeth and inhibit movement of the rack arrangement relative to the frame member when the seat is subject to at least a predetermined force.

15. The seat-back adjustment system of claim 14, wherein the adjustment rack is configured for attachment to a pivotable seat back of the seat, and wherein the adjustment rack has a length, and at least a portion of the length is arcuate to facilitate arcuate movement of the seat back when the seat back is adjusted by movement of the adjustment rack.

16. The seat-back adjustment system of claim 14, wherein the at least one locking element includes a locking element tooth configured to engage the locking teeth when the seat is subject to at least the predetermined force, and wherein the rack arrangement further incudes a frangible cover portion positioned to maintain separation between the locking teeth and the locking element tooth prior to the seat being subject to the predetermined force, the frangible cover portion being configured to break when the seat is subject to at least the predetermined force to facilitate engagement between the locking teeth and the locking element tooth.

* * * * *

UNITED STATES PATENT AND TRADEMARK OFFICE
CERTIFICATE OF CORRECTION

PATENT NO. : 11,254,243 B2
APPLICATION NO. : 16/690973
DATED : February 22, 2022
INVENTOR(S) : Eckhard Nock et al.

Page 1 of 1

It is certified that error appears in the above-identified patent and that said Letters Patent is hereby corrected as shown below:

In the Claims

Column 7, Lines 11-12, Claim 1:
After "at least one locking element further includes a second tooth"
Insert -- positioned to --.

Signed and Sealed this
Thirtieth Day of August, 2022

Katherine Kelly Vidal
*Director of the United States Patent and Trademark Office*